(12) United States Patent
Szybist et al.

(10) Patent No.: US 8,291,872 B2
(45) Date of Patent: Oct. 23, 2012

(54) HIGHLY EFFICIENT 6-STROKE ENGINE CYCLE WITH WATER INJECTION

(75) Inventors: James P. Szybist, Knoxville, TN (US); James C. Conklin, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 706 days.

(21) Appl. No.: 12/483,388

(22) Filed: Jun. 12, 2009

(65) Prior Publication Data

US 2010/0313831 A1 Dec. 16, 2010

(51) Int. Cl.
*F02B 47/02* (2006.01)
(52) U.S. Cl. .................................. 123/64; 123/25 C
(58) Field of Classification Search ....... 123/25 R–25 Q, 123/64
See application file for complete search history.

(56) References Cited

U.S. PATENT DOCUMENTS

| | | | |
|---|---|---|---|
| 1,339,176 A | 5/1920 | Dyer | |
| 2,671,311 A | 3/1954 | Rohrbach et al. | |
| 3,964,263 A | 6/1976 | Tibbs | |
| 4,143,518 A | 3/1979 | Kellogg-Smith | |
| 4,736,715 A | 4/1988 | Larsen | |
| 4,976,226 A | 12/1990 | Herman | |
| 6,253,745 B1 | 7/2001 | Prater | |
| 6,311,651 B1 | 11/2001 | Singh | |
| 6,986,252 B2 * | 1/2006 | Hedman | 123/25 C |
| 2003/0188700 A1 * | 10/2003 | Mitsuhashi et al. | 123/25 C |
| 2007/0022955 A1 | 2/2007 | Bender et al. | |
| 2007/0022977 A1 * | 2/2007 | Crower | 123/25 C |

* cited by examiner

*Primary Examiner* — Noah Kamen
(74) *Attorney, Agent, or Firm* — Luedeka Neely Group, P.C.

(57) ABSTRACT

A six-stroke engine cycle having improved efficiency. Heat is recovered from the engine combustion gases by using a 6-stroke engine cycle in which combustion gases are partially vented proximate the bottom-dead-center position of the fourth stroke cycle, and water is injected proximate the top-dead-center position of the fourth stroke cycle.

14 Claims, 2 Drawing Sheets

HIGHLY EFFICIENT 6-STROKE ENGINE CYCLE WITH WATER INJECTION

GOVERNMENT RIGHTS

This invention was made with government support under Contract No. DE-AC05-00OR22725 awarded by the U.S. Department of Energy. The government has certain rights in the invention.

FIELD

This disclosure relates to the field of internal combustion engines. More particularly, this disclosure relates to six-stroke cycle internal combustion engines utilizing water injection.

BACKGROUND

In both gasoline engines and diesel engines, which typically operate in a 4-stroke Otto or Diesel cycle, a large fraction of the fuel energy is not converted to work, but instead leaves the system as thermal energy in the form of hot combustion gases and hot engine coolant. Attempts have been made to operate engines in a 6-stroke engine cycle in which water is injected in an attempt to recover energy from the hot combustion gases. However, improvement remains desirable.

The present disclosure provides engines which operate on an improved six-stroke cycle having water injection directly into the combustion chamber which offer improved operating efficiency of the engines.

SUMMARY

The present disclosure relates to a six-stroke engine cycle having improved efficiency. Heat is recovered from the engine combustion gases by using a 6-stroke engine cycle in which combustion gases are partially vented proximate the bottom-dead-center position of the fourth stroke cycle, and water is injected proximate the top-dead-center position of the fourth stroke cycle.

According to a preferred embodiment, an internal combustion engine is provided which is operable in a 6-stroke engine cycle. The engine includes a fourth stroke cycle in which combustion gases of the engine are partially vented proximate a bottom-dead-center position of the fourth stroke cycle, and water is injected proximate a top-dead-center position of the fourth stroke cycle.

In another aspect of the disclosure, there is disclosed a method of operating an internal combustion engine having a piston reciprocally movable in a cylinder to provide a six-stroke cycle.

In a preferred embodiment, the method includes providing six-stroke cycles. In the first stroke of the cycle, a piston travels in a cylinder in a direction toward a crankshaft, with an intake valve of the cylinder in an open condition, an exhaust valve of the cylinder in a closed condition, and an air-fuel mixture is introduced via the intake valve into the cylinder. In a second stroke of the cycle, the intake valve and the exhaust valve are both closed, and the piston travels in the cylinder in a direction away from the crankshaft to compress the air-fuel mixture. Combustion of the air-fuel mixture begins towards the end of the compression stroke (50 to 0 degrees crankshaft angle before end of compression). In the third stroke of the cycle, the intake valve and the exhaust valve are both closed, the fuel-air mixture completes combustion with the piston traveling toward the crankshaft in response to the expanding and combusting air-fuel mixture.

In a fourth stroke cycle, there are three distinct events. A first event begins substantially simultaneous with a bottom dead center position of the piston, in which the intake valve is closed and the exhaust valve is open, with the piston traveling away from the crankshaft. In a second event, the exhaust valve and the inlet valve are each closed, with the piston traveling away from the crankshaft, the second event ending when the piston is proximate a top dead center position of the piston. The third event begins substantially simultaneous with the top dead center position of the piston. In the third event, the exhaust valve and the inlet valve are each closed and a volume of water is injected from a water injector into the cylinder during the third event.

Following the fourth stroke cycle, there is a fifth stroke cycle in which the intake valve and the exhaust valve are closed, with the piston traveling toward the crankshaft in response to the increased pressure caused by the conversion of the injected water to steam. Finally, in a sixth stroke cycle, the intake valve is closed and the exhaust valve is open, with the piston traveling away from the crankshaft and the contents of the cylinder being exhausted from the cylinder via the exhaust valve.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred embodiments, reference is made to the accompanying drawings, which form a part hereof, and within which are shown by way of illustration an engine 10 (FIG. 1) and six-stroke operating cycle 12 (FIG. 2) according to preferred embodiments of the disclosure. It is to be understood that other embodiments may be utilized, and that structural changes may be made and processes may vary in other embodiments.

In brief overview, the present disclosure relates to an engine and an engine cycle for operation of the engine that substantially increases the thermal efficiency of the engine. The increased efficiency is a result of recovering heat primarily from the engine combustion gases, and also from the engine coolant. The recovered heat is converted to mechanical energy at the crankshaft by expanding steam in the engine combustion chamber. This form of in-cylinder waste heat recovery is accomplished by using a 6-stroke engine cycle and a unique set of valve events in which combustion gases are partially vented proximate the bottom-dead-center position of the fourth stroke cycle, and water is injected proximate the top-dead-center position of the fourth stroke cycle.

Figure 1:
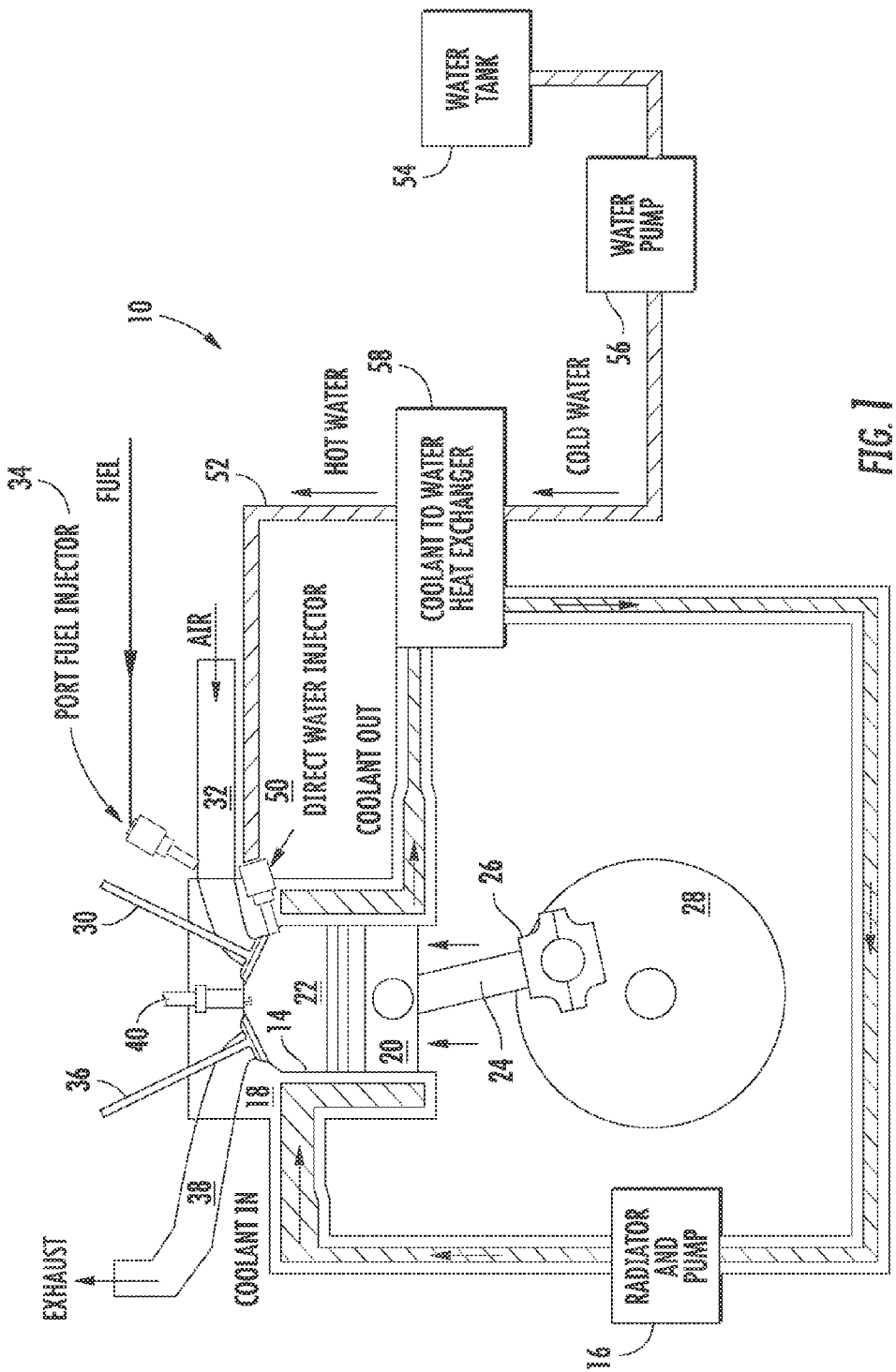
FIG. 1 is a schematic view of an internal combustion engine according to a preferred embodiment of the disclosure.

With reference to FIG. 1, the engine 10 is an internal combustion engine having one or more cylinders 14. The engine 10 may be a gasoline engine, ethanol engine, diesel engine, natural gas engine, or the like, and may be a single or multi-cylinder engine. Additionally, the engine cylinders may be arranged in an in-line, V-shaped, opposed, radial, or other configuration. The engine 10 is preferably a liquid-cooled engine having a radiator and liquid pump system 16 configured to flow liquid coolant under pressure through a block 18 of the engine surrounding the cylinder 14. The cylinder 14 includes a piston 20 having a piston crown 22 connected with a connecting rod 24 to a driven crankshaft 26 attached to a load 28. The piston crown 22 is reciprocally mounted within the cylinder 14.

An intake valve 30 is located adjacent an upper portion of the cylinder 14 in flow communication with an inlet manifold or conduit 32 and is operable to regulate the flow of air and fuel into the cylinder 14. The fuel and air may be introduced into the conduit 32 by a variety of conventional methods, with a fuel injector 34 preferably utilized for introducing fuel. For example, for diesel engines, the fuel injector 34 provides direct injection of diesel fuel and, for gasoline engines, the fuel injector 34 may introduce fuel by direct injection, port fuel injection, or carbureted injection.

An exhaust valve 36 is located adjacent an upper portion of the cylinder 14 opposite the intake valve 30. The exhaust valve 36 is in flow communication with an exhaust manifold or conduit 38, and is operable to regulate flow out of the cylinder 14. An ignitor 40, such as a spark plug, is utilized to initiate combustion in the case of a gasoline engine and is located at an upper portion of the cylinder 14 adjacent the intake valve 30 and the exhaust valve 36 for igniting combustible fuel within the cylinder 14, such as is provided by a mixture of air and fuel provided via the intake valve 30. No ignitor is required in the case of compression ignition engines.

According to the disclosure, a water injector 50 is located for injecting water into an upper portion of the cylinder 14. For use in most engines, the water injector 50 is configured to introduce a small amount of water where the amount of water is dependent on desired power output, with the water in the conduit 52 being maintained at a pressure sufficient to retain the water in the conduit 52 in a liquid state. The injector 50 is in flow communication via a conduit 52 with a source of water 54. A pump 56 cooperates with the injector 50 and the source of water 54 for desirably controlling the flow of water, as described below. To desirably pre-heat water introduced into the cylinder 14 via the water injector 50, a heat exchanger 58 is located to receive flow of the radiator and pump system 16 and the conduit 52, so that thermal energy (heat) from the radiator and pump system 16 may be transferred to water within the conduit 52. In a preferred embodiment, the water in the conduit 52 is preferably at a temperature of about 100° C. as it enters the injector 50. In one aspect of the disclosure, this advantageously enables recovery of heat from the engine coolant for improving the efficiency of the engine. Conventionally, heat from the engine coolant is dissipated by the radiator and wasted.

Figure 2:
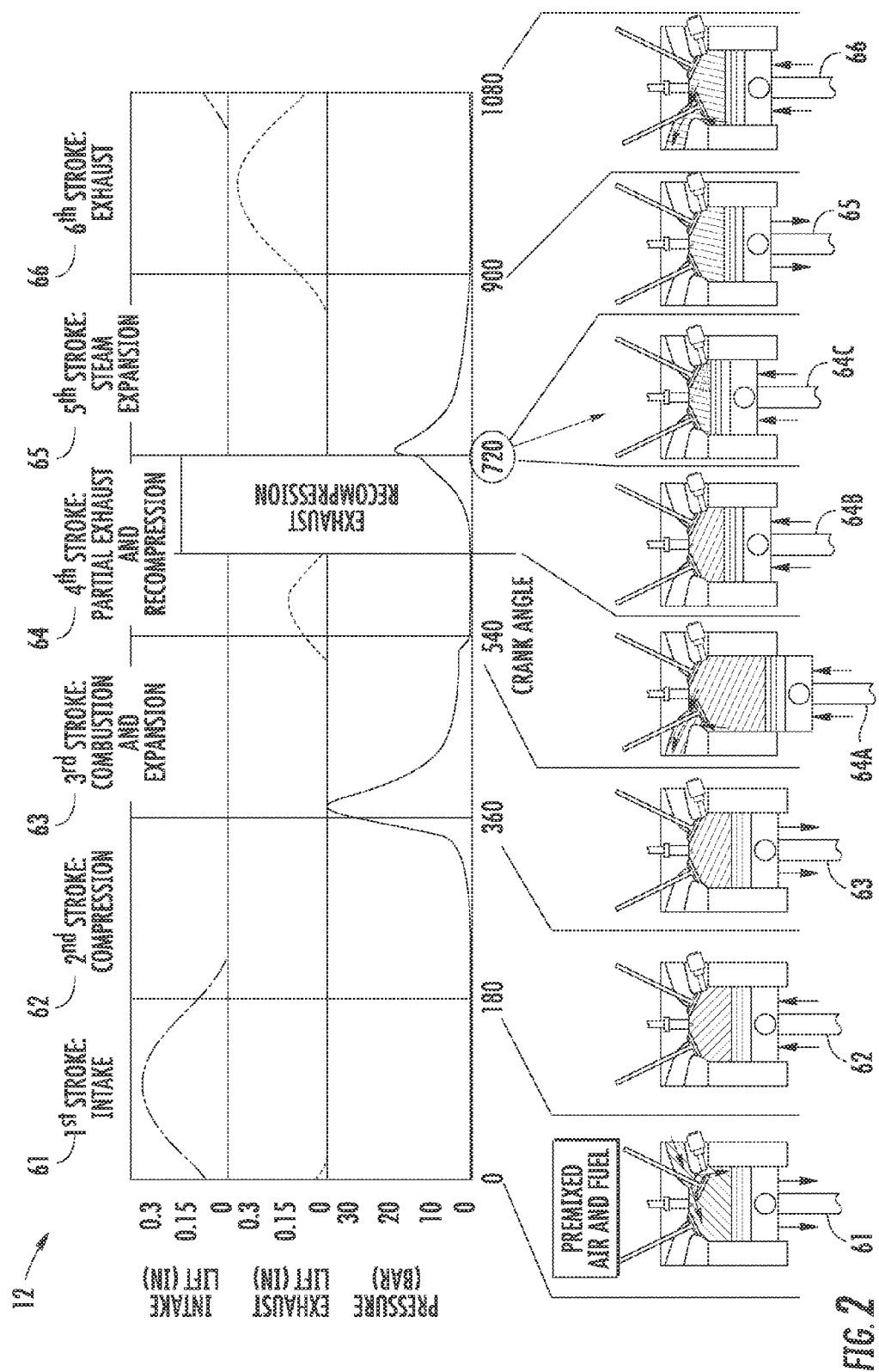
FIG. 2 shows an improved six-stroke operation cycle of the engine of FIG. 1 according to a preferred embodiment of the disclosure.

With reference to FIG. 2, the six-stroke cycle 12 advantageously enables recovery of heat from engine combustion gases and subsequent conversion of the recovered heat to mechanical energy at the crankshaft by expanding steam in the engine combustion chamber. The first three stroke cycles of the six-stroke cycle 12 correspond to the first three stroke cycles of conventional Otto and Diesel cycles. Following the first three stroke cycles, the next three stroke cycles provide a unique set of valve events that recovers heat and converts the recovered heat to mechanical energy at the crankshaft by expanding steam in the engine combustion chamber.

As shown sequentially in FIG. 2, the cycle 12 initially operates through a 1$^{st}$ stroke cycle 61 characterized as an intake stroke in which the piston 20 travels downwardly, the intake valve 30 is open, the exhaust valve 36 is closed, and air and fuel in a pre-mixed desired ratio enter the cylinder 14 via the conduit 32 and the injector 34. In a second stroke cycle 62, characterized as a compression stroke, the intake valve 30 and the exhaust valve 36 are both closed, and the piston 20 travels upwardly to compress the air-fuel mixture. In the case of the gasoline configuration, the mixture is ignited by a spark plug or other ignitor within the final 50 crankshaft angle degrees of compression, and in the case of the diesel configuration, the fuel is injected directly into the cylinder within the final 10 crankshaft angle degrees of compression. In a third stroke cycle 63, characterized as a combustion and expansion stroke, the intake valve 30 and the exhaust valve 36 are both closed, with combustion completing while the piston 20 is traveling downwardly in response to the expanding and combusting air-fuel mixture.

In a fourth stroke cycle 64, having events 64A, 64B, and 64C, characterized as a partial exhaust and recompression stroke, the exhaust valve 36 is opened for a very brief portion of time of the cycle 64 (the intake valve 30 closed), as represented by the event 64A while the piston 20 is traveling upwardly, but while the piston 20 is substantially at the beginning of the upward stroke. In a preferred embodiment, the event 64A begins at the bottom-dead-center position (BDC) of the piston 20, which corresponds to a crankshaft angle of 540 degrees, and ends approximately 20-120 degrees later, corresponding to a crankshaft angle of 560-660 degrees. The exact crankshaft angle when the exhaust valve closes for event 64A will vary due to engine size and demand. In this regard, it will be understood that BDC is the position of the piston 20 in which it is closest to the crankshaft 26 and where the cylinder volume is at a maximum. The short duration of the event 64A advantageously traps a desired portion, but not all, of the combustion products produced in the third stroke cycle 63.

In this regard, it has been observed that advantageous results are achieved by utilization of the event 64A, which desirably exhausts from about 20 to about 70 percent of the combustion products produced in the third stroke cycle 63. By utilization of a short exhaust event at the start of the fourth cycle 64, as represented by event 64A, it has been observed that the water injected by the injector 50 undergoes substantially instantaneous vaporization as it enters the cylinder 14. To the contrary, it has been observed that failure to have an exhaust event corresponding to event 64A, or else having a longer duration exhaust event than described is disadvantageous to the overall cycle efficiency. In any engine cycle, the net useable work is the difference between the work obtained from the expansion at a high pressure less the work required to compress the gas from a low pressure. Based on fundamental thermodynamics analysis, there is an optimum value of net work that results from closure of the exhaust valve at a crankshaft angle in the range of 560-660 degrees. If the exhaust valve is not opened at all, or is closed earlier than optimum, the compression work on the combustion gases required is disadvantageously large. If the exhaust valve is closed later than this optimum crankshaft angle, the expansion work obtained from the expanding steam is disadvantageously lower because of the lower energy content of the compressed gases available to change the liquid water to steam. The exact value of this exhaust valve closure to obtain optimum net work of the cycle will be dependent on engine speed and demanded power, thus the optimum timing for exhaust valve closure is reported as a range.

The conversion of liquid water to steam requires either adding energy or a significant reduction in pressure. If this phase-change process occurs at a constant pressure, the volume for a given mass of water is increased. Conversely, if liquid water is converted to steam during a constant volume process, a substantial increase in pressure results. The work obtained from an expansion is a direct function of the pressure in the cylinder, thus a high initial pressure for the steam expansion is desirable. Thus to obtain the maximal work from the steam expansion, the conversion of liquid water to steam best occurs while the piston is at the start of the fifth stroke at a crankshaft angle of 720 degrees and the combustion chamber is effectively at an instantaneous minimum constant volume. The energy necessary to convert the liquid water to steam is derived primarily from the compressed combustion gas, while some energy may be transferred from the combustion chamber and cylinder walls. In addition, some of the phase-change from liquid water to steam will occur from "flashing" because the liquid water must be injected at a higher pressure than the compressed combustion gases, and the subsequent reduction in pressure will result in steam generation. To obtain the highest initial pressure possible, all these steam generation processes should occur instantaneously at 720 degrees of crankshaft rotation where the cylinder volume is at a minimum. However, because of the dynamics of liquid pumps and injectors, the actual liquid injection process will most likely require some lead time and will occur over a finite amount of time. Thus in order to obtain the optimal net work of the additional strokes of this cycle, the water injection process may start slightly before 720 degrees, and as early as 700 degrees, of crankshaft rotation in order to obtain the maximum initial steam pressure at the beginning of the fifth, or second power, stroke.

After the event 64A, the event 64B occurs, during which the exhaust valve 36 is closed (the inlet valve 30 remaining closed) and the piston 20 continues upward travel. The event 64B begins at a crankshaft angle in the range of 560-660 degrees and ends at the top-dead-center position of the piston 20. In the following event 64C, during which the exhaust valve 36 and inlet valve 30 remain closed, water is injected into the cylinder 14 via the water injector 50. In this regard, it will be understood that TDC is the position of the piston 20 in which it is farthest from the crankshaft 26 and the cylinder volume is at a minimum.

According to the disclosure, water is injected into the cylinder 14 by the injector 50 for a brief period of time substantially corresponding to the time during which the piston 20 is proximate the top-dead-center position of the fourth stroke cycle, which substantially corresponds to a crankshaft angle of 720 degrees (e.g., 180 degrees per stroke cycle×four cycles=720 degrees). Given the practical logistics of engine timing limitations, the time for water injection, that is, the beginning of the third event 64C, may begin at about 20 degrees prior to TDC of the fourth stroke cycle, most preferably within about 2 to 3 degrees prior to TDC. In an alternate embodiment, described below, the event 64C may occur at the beginning of or continue into the fifth stroke cycle. That is, the water injection may occur at any time while the piston 20 is proximate the TDC position, be that 10 degrees prior or 10 degrees after TDC. Thus, water injection may begin in the period just slightly before TDC and end just slightly past TDC of the fourth stroke cycle. Therefore, since TDC is the end of the fourth stroke cycle 64, some water injection may extend into an initial phase of a fifth stroke cycle, as explained below. Accordingly, it will be understood that water injection is preferably performed when the crankshaft angle is between about 700 degrees and 730 degrees to achieve substantially instantaneous vaporization of the introduced water.

In a fifth stroke cycle 65, characterized as a steam expansion stroke, the intake valve 30 and the exhaust valve 36 remain closed while the piston 20 travels downwardly. However, as described above, some water injection may extend into an initial phase of the fifth stroke cycle, this preferably represents on up to about 2 to 3 degrees past TDC (a crankshaft angle of ~723 degrees), up to a maximum of about 10 degrees past TDC (a crankshaft angle of ~730 degrees).

In regards to the desired timing of the injection of water according to the disclosure, i.e., when the piston 20 is proximate (e.g. 700-730 crankshaft angles) the TDC of the fourth stroke cycle, it has been observed that injection of the water at such time advantageously results in substantially instantaneous vaporization of the injected water. The injected water rapidly extracts heat from the re-compressed combustion gases and rapidly increases the cylinder pressure through substantially instantaneous vaporization. The increased cylinder pressure creates a second power stroke during the downward motion of the fifth stroke cycle. Thereafter, on a sixth stroke cycle 66, characterized as an exhaust stroke, the intake valve 30 is closed and the exhaust valve 36 is open while the piston 20 travels upwardly and the contents of the cylinder 14 are exhausted via the exhaust conduit 38.

The intake valve 30 and the exhaust valve 36 may be controlled by a variety of valve control systems commonly used for controlling the operation of engine valves relative to the crankshaft angle. For example, the valves may be directly controlled as by use of a cam or cams driven by a camshaft connected to the crankshaft. The valves may alternatively be indirectly controlled, such as by use of pneumatic or electronic controllers having associated crankshaft angle sensors.

Operation of an engine according to the described six-stroke cycle advantageously enables improved engine efficiency as compared to prior four-stroke and six-stroke cycles. The increased efficiency is a result of recovering heat primarily from the engine exhaust gases, and also from the engine coolant. The recovered heat is converted to mechanical energy at the crankshaft by expanding steam in the engine combustion chamber. This form of in-cylinder waste heat recovery is accomplished by using a 6-stroke engine cycle in which combustion gases are partially vented proximate the bottom-dead-center position of the fourth stroke cycle, and water is injected proximate the top-dead-center position of the fourth stroke cycle.

There are many additional modifications to the previous description of embodiments. For example, in addition to the Otto and Diesel cycles described here, the Atkinson cycle having unequal compression and expansion ratios could benefit from addition of the two extra strokes described here. Another possibility is the use of a direct injection gasoline engine, rather than the port fuel injection described here. An engine using another ignition concept called Homogeneous Charge Compression Ignition (HCCI) would also benefit from the embodiment. Increasing the injection water temperature with the heat contained in the exhaust gas leaving the engine would also be considered here.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

The invention claimed is:

1. A method of operating an internal combustion engine having a piston reciprocally movable in a cylinder to provide a six-stroke cycle, the method comprising the steps of:
   performing a first stroke cycle in which a piston travels in a cylinder in a direction toward a crankshaft, with an intake valve of the cylinder in an open condition, an exhaust valve of the cylinder in a closed condition, and an air-fuel mixture introduced via the intake valve into the cylinder;
   performing a second stroke cycle, in which the intake valve and the exhaust valve are both closed, and the piston travels in the cylinder in a direction away from the crankshaft to compress the air-fuel mixture, with combustion of the fuel-air mixture beginning towards the end of the compression stroke;
   performing a third stroke cycle, in which the intake valve and the exhaust valve are both closed, with the piston traveling toward the crankshaft while the air-fuel mixture is combusting and expanding;
   performing a fourth stroke cycle having:
     (a) a first event that begins substantially simultaneous with a bottom dead center position of the piston, in which the intake valve is closed and the exhaust valve is open, with the piston traveling away from the crankshaft,
     (b) a second event in which the exhaust valve and the inlet valve are each closed, with the piston traveling away from the crankshaft and compressing exhaust gases in the cylinder, the second event ending when the piston is proximate a top dead center position of the piston, and
     (c) a third event that begins substantially simultaneous with the top dead center position of the piston, in which the exhaust valve and the inlet valve are each closed and a volume of water is injected from a water injector into the cylinder during the third event;
   performing a fifth stroke cycle, in which the intake valve and the exhaust valve are closed, with the piston traveling toward the crankshaft while the water is vaporized and steam pressure forces the piston towardly; and
   performing a sixth stroke cycle, in which the intake valve is closed and the exhaust valve is open, in which the piston traveling away from the crankshaft, and in which the contents of the cylinder are exhausted from the cylinder via the exhaust valve.

2. The method of claim 1, further comprising heating the water using heat recovered from the engine prior to injection of the water into the cylinder.

3. The method of claim 2, wherein the step of heating the water to be injected comprises providing a heat exchanger located to receive flow of a coolant from a radiator and pump system associated with the engine and utilizing the heat exchanger to recover thermal energy from the radiator and pump system and to transfer recovered heat to the water to be injected.

4. The method of claim 1, wherein the bottom dead center position of the piston that begins the first event corresponds to a crankshaft angle of about 540 degrees, and wherein the first event of the 4$^{th}$ stroke ends when the piston is at a position that corresponds to a crankshaft angle in the range of 560-660 degrees.

5. The method of claim 4, wherein the second event of the 4$^{th}$ stroke begins at the end of the first event.

6. The method of claim 1, wherein the third event begins when the piston is at a position that corresponds to a crankshaft angle of from about 700 degrees to about 730 degrees.

7. The method of claim 1, wherein an ignitor begins the combustion of the fuel-air mixture.

8. An internal combustion engine comprising:
   a piston reciprocally movable in a cylinder relative to a crankshaft, the cylinder having operatively associated therewith an intake valve; an exhaust valve, a controller for controlling the operation of the intake valve and the exhaust valve, and a water injector; the engine being configured to operate in a six stroke cycle comprising:
   a first stroke cycle in which the piston travels in the cylinder in a direction toward the crankshaft, with the intake valve of the cylinder in an open condition, the exhaust valve of the cylinder in a closed condition, and an air-fuel mixture introduced via the intake valve into the cylinder;
   a second stroke cycle in which the intake valve and the exhaust valve are both closed, and the piston travels in the cylinder in a direction away from the crankshaft to compress the air-fuel mixture, with combustion of the air-fuel mixture initiated towards the end of the compression stroke;
   a third stroke cycle in which the intake valve and the exhaust valve are both closed, with the piston traveling toward the crankshaft while the air-fuel mixture is combusting and expanding to produce heated combustion gases in the cylinder;
   a fourth stroke cycle including:
     (a) a first event that begins substantially simultaneous at a bottom dead center position of the piston, in which the intake valve is closed and the exhaust valve is open, with the piston traveling away from the crankshaft to partially exhaust the cylinder,
     (b) a second event in which the exhaust valve and the inlet valve are each closed, with the piston traveling away from the crankshaft and compressing combustion gasses in the cylinder, the second event ending when the piston is proximate a top dead center position of the piston, and
     (c) a third event that begins substantially simultaneous at the top dead center position of the piston, in which the exhaust valve and the inlet valve are each closed and a volume of water is injected from a water injector into the cylinder during the third event;
   a fifth stroke cycle in which the intake valve and the exhaust valve are closed, with the piston traveling toward the crankshaft and the water being vaporized in part by heat from the compressed combustion gasses in the cylinder; and
   a sixth stroke cycle, in which the intake valve is closed and the exhaust valve is open, with the piston traveling away from the crankshaft and the contents of the cylinder are exhausted from the cylinder via the exhaust valve.

9. The engine of claim 8, further comprising a radiator and pump system for cooling the engine with a coolant, and a heat exchanger located to receive flow of the coolant from the radiator and pump system, and wherein the heat exchanger is operated to recover thermal energy from the radiator and pump system and to transfer recovered heat to the water to be injected.

10. The engine of claim 8, wherein the bottom dead center position of the piston that begins the first event corresponds to a crankshaft angle of about 540 degrees, and wherein the first event of the 4$^{th}$ stroke ends when the piston is at a position that corresponds to a crankshaft angle of about 560 to 660 degrees.

11. The engine of claim 10, wherein the second event of the 4$^{th}$ stroke begins at the end of the first event.

12. The engine of claim 8, wherein the third event begins when the piston is at a position that corresponds to a crankshaft angle of from about 700 degrees to about 730 degrees.

13. The engine of claim 8, wherein with an ignitor located within the cylinder is operated to initiate combustion.

14. An internal combustion engine operable in a 6-stroke engine cycle, comprising a fourth stroke cycle of the engine in which combustion gases of the engine are partially vented during the fourth stroke cycle and some combustion gasses are compressed in the cylinder during the fourth stroke cycle, and water is injected proximate a top dead center position of the fourth stroke cycle such that the water is substantially instantaneously vaporized at least in part by heat from the compressed combustion gasses in the cylinder.

* * * * *